March 12, 1929. H. V. MEATHERS 1,705,370
APPARATUS FOR RECLAIMING CRUDE OIL
Filed Feb. 11, 1928
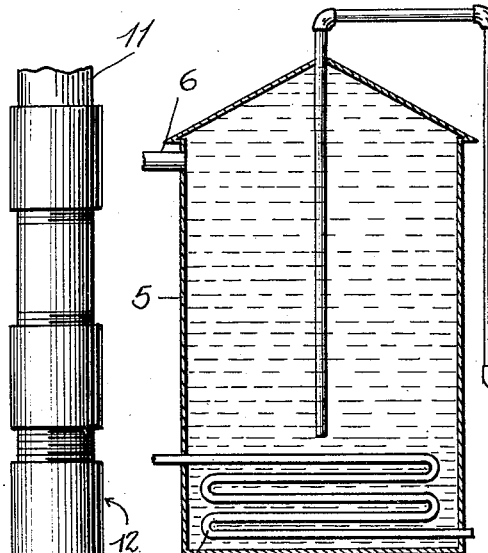
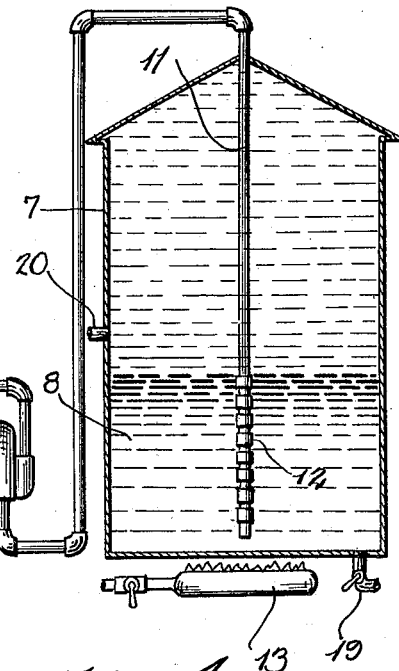
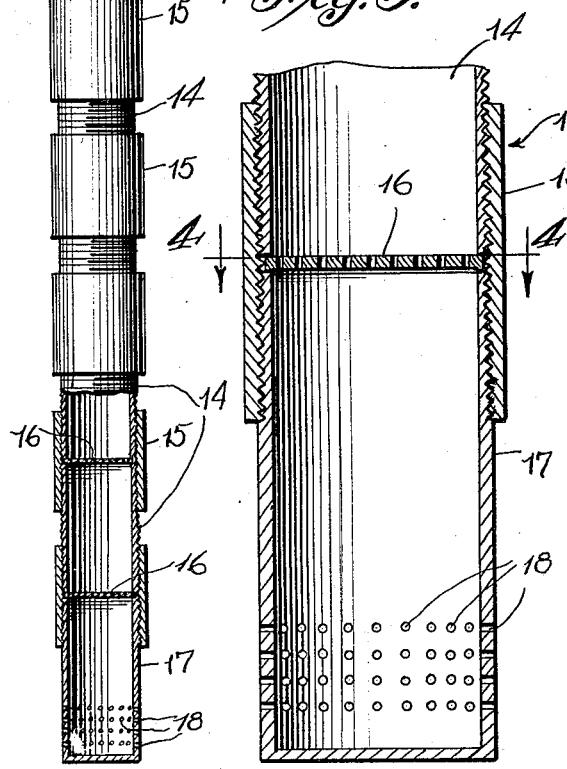
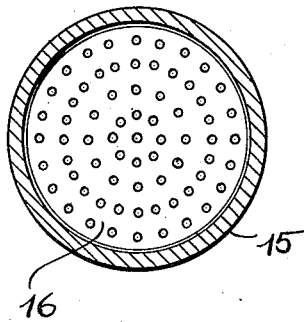
INVENTOR.
Harry V. Meathers
BY
ATTORNEY.

Patented Mar. 12, 1929.

1,705,370

UNITED STATES PATENT OFFICE.

HARRY V. MEATHERS, OF TULSA, OKLAHOMA.

APPARATUS FOR RECLAIMING CRUDE OIL.

Application filed February 11, 1928. Serial No. 253,630.

This invention relates to an improved process of and apparatus for reclaiming crude oil from basic sediment oil such as is usually found at the bottom of reservoirs used for storing crude oil in the oil fields.

The primary object of the present invention is to provide for the recovery of a comparatively high percentage of crude oil from basic sediment oil in a simple and expeditious manner.

Still another object is to provide an efficient process of the above kind which may be readily carried out without the exercise of special skill.

Still another object is to provide an apparatus of the kind specified above which is extremely simple in construction as well as thoroughly efficient and reliable in operation.

The invention consists in the novel process and apparatus hereinafter more fully described, shown in the accompanying drawing and claimed.

In the drawing:—

Figure 1 is a somewhat diagrammatic view, partly in vertical section and partly in elevation, of an apparatus adapted for use in carrying out the reclaiming process in accordance with the present invention;

Figure 2 is an enlarged view, partly in elevation and partly in longitudinal section, of the breaker barrel forming part of the apparatus shown in Figure 1;

Figure 3 is a still further enlarged fragmentary sectional view of the lower end of the breaker barrel, showing the disseminating nozzle thereof, and the manner of mounting the perforated baffles of the same which are used for breaking up the basic sediment oil; and Figure 4 is a horizontal section on line 4—4 of Figure 3.

Referring more in detail to the drawing, the reclaming apparatus embodies a heating tank 5 into which the basic sediment oil is suitably admitted, as by means of an inlet 6, suitable means such as a steam heating coil 7 provided in the bottom of the tank 5, being adapted to heat the basic sediment oil in the tank 5 for converting it into a free flowing fluid state. The apparatus further includes a separating or settling tank 7 in the lower portion of which water is maintained to a desired level, by any suitable means, as at 8, a pipe line 9 being provided for conducting the heated basic sediment oil from the heating tank 5 to the tank 7, and a suitable pump 10 being interposed in the pipe line 9 for positively withdrawing the basic sediment oil from the heating tank 5 and forcing it under pressure into the tank 7.

As shown, a vertical column 11 is provided in the tank 7 with its upper end connected to the pipe line 9 and its lower end terminating substantially at the level of the water in the tank 7 as at 8, a breaker barrel 12 being connected to the lower end of the column 11 and submerged in the water or equivalent fluid at 8. In order to assist in the reclaiming operation and avoid congealing of the basic sediment oil, the water 8 is heated to a proper temperature by any suitable means diagrammatically illustrated as a burner at 13.

As shown clearly in Figures 2 to 4 inclusive, the breaker barrel 12 is composed of a plurality of tubular nipples 14 joined in end to end relation by means of coupling sleeves 15, a perforated or foraminous baffle plate 16 being interposed and clamped at its margin between the adjacent ends of each pair of adjacent nipples 14 as well as between the lowermost nipple 14 and the upper end of an oil outlet and disseminating nozzle 17 connected to the lowermost nipple 14 as shown in Figures 2 and 3. A simple and durable form of breaker barrel is thus provided which is divided into a series of communicating breaker chambers, each constituted by the interior of a nipple 14. As shown, the outlet nozzle 17 is closed at its lower end and provided with numerous small outlet openings 18 in and entirely about the body or cylindrical wall thereof.

In carrying out the present process, the basic sediment oil is introduced into the tank 5 and suitably heated, whereupon the pump 10 is placed into operation for forcibly pumping the heated sediment oil from the tank 5 and discharging it into the upper end of the column 11. As the column 11 is comparatively long, the weight of the oil therein in conjunction with the pressure produced by the pump 10 causes the basic sediment oil to be forcibly shot through the successive chambers of the breaker barrel 10 and out of the outlet nozzle 17 into the water at 8. The basic sediment oil, in passing through the perforated baffle plates 16 is thoroughly broken up, and as it passes in all directions, laterally from the outlet nozzle 17 into the heated water at 8, the same is thoroughly disseminated in this heated water, thus completely breaking up the globules of paraffin which holds water in suspension in the basic sediment oil, thereby freeing the crude oil and permitting it to immedately rise to the surface of the water by virtue of its lighter gravity and being thus released from the paraffin, water and other sediment or dirt forming constituent parts of the basic sediment oil. The heavier matter will settle to the bottom of the tank 7 where it may be drawn off in any suitable manner as provided for at 19, the reclaimed lighter crude oil floating on the water being suitably drawn or pumped off through an outlet provided as generally indicated at 20 above the level of the water.

It has been found by actual reduction to practice that with the process and apparatus described above, a very high percentage of crude oil can be recovered from very old basic sediment oil at a comparatively low cost and in a most expeditious manner. Furthermore, it is obvious that the simplicity of construction lends itself readily to the provision of portable apparatus adapted to be taken from one field to another with but very little expense.

Minor changes may be made without departing from the spirit and scope of the invention is claimed.

What I claim as new is:—

1. In an apparatus for reclaiming crude oil from basic sediment oil, a heating tank to receive the basic sediment oil, a separator tank to receive and be partially filled with water, means for heating the water, a relatively long pressure column in the upper part of the separator tank, means to transfer the heated basic sediment oil from the heating tank and force it under pressure into the upper end of said column, a breaker barrel on the lower end of the column having an outlet nozzle at its lower end arranged to be submerged in and to disseminate the broken basic sediment oil through the water, said breaker barrel embodying a plurality of nipples joined in end to end relation and a perforated baffle clamped at its margin between the adjacent ends of each pair of adjacent nipples.

2. In reclaiming crude oil, a breaker barrel comprising a plurality of nipples joined end to end, a perforated baffle clamped at its margin between the adjacent ends of each pair of adjacent nipples, and a laterally perforated disseminator outlet nozzle joined to the lowermost nipple.

In testimony whereof I affix my signature.

HARRY V. MEATHERS.